(12) United States Patent
Lin et al.

(10) Patent No.: US 7,554,236 B2
(45) Date of Patent: Jun. 30, 2009

(54) MOTOR

(75) Inventors: Yu-Chih Lin, Taoyuan Hsien (TW);
Hung-Chi Chen, Taoyuan Hsien (TW);
Te-Tsai Chuang, Taoyuan Hsien (TW);
Wen-Shi Huang, Taoyuan Hsein (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 88 days.

(21) Appl. No.: 11/437,670

(22) Filed: May 22, 2006

(65) Prior Publication Data
US 2006/0267435 A1  Nov. 30, 2006

(30) Foreign Application Priority Data
May 27, 2005  (TW) .............................. 94117434 A

(51) Int. Cl.
*H02K 5/16*  (2006.01)

(52) U.S. Cl. ...................................... 310/90; 310/67 R

(58) Field of Classification Search .................. 310/90, 310/67 R
See application file for complete search history.

(56) References Cited

U.S. PATENT DOCUMENTS

| | | | | |
|---|---|---|---|---|
| 1,448,189 A | * | 3/1923 | Brunner | 384/611 |
| 4,672,250 A | * | 6/1987 | Seitz | 310/90 |
| 4,699,528 A | * | 10/1987 | Gotman | 384/536 |
| 4,896,239 A | * | 1/1990 | Ghose | 360/267 |
| 5,128,574 A | * | 7/1992 | Koizumi et al. | 310/90 |
| 5,210,665 A | * | 5/1993 | Nishizawa | 360/99.08 |
| 5,316,393 A | * | 5/1994 | Daugherty | 384/517 |
| 5,663,604 A | * | 9/1997 | Takahashi | 310/91 |
| 5,687,016 A | * | 11/1997 | Seto | 359/200 |
| 5,775,750 A | * | 7/1998 | Gauci et al. | 293/2 |
| 6,107,717 A | * | 8/2000 | Lin et al. | 310/90 |
| 6,320,291 B1 | * | 11/2001 | Lin et al. | 310/91 |
| 6,342,743 B1 | * | 1/2002 | Matsuzaki et al. | 310/90 |
| 6,617,736 B1 | * | 9/2003 | Horng et al. | 310/91 |
| 6,707,224 B1 | * | 3/2004 | Petersen | 310/254 |
| 6,737,771 B2 | * | 5/2004 | Fujita et al. | 310/68 B |
| 7,237,962 B2 | * | 7/2007 | Zernikow et al. | 384/518 |
| 2003/0202878 A1 | * | 10/2003 | Huang et al. | 415/220 |
| 2004/0046467 A1 | * | 3/2004 | Huang et al. | 310/90.5 |
| 2004/0227422 A1 | * | 11/2004 | Chang et al. | 310/91 |
| 2005/0116557 A1 | * | 6/2005 | Rojo Lulic | 310/67 R |

FOREIGN PATENT DOCUMENTS

| | | | | |
|---|---|---|---|---|
| WO | WO 2004018791 A1 | * | 6/2004 | |
| WO | WO 2004048791 A1 | * | 6/2004 | |
| WO | WO 2004057729 A1 | * | 7/2004 | |

* cited by examiner

*Primary Examiner*—Quyen Leung
*Assistant Examiner*—Naishadh N Desai
(74) *Attorney, Agent, or Firm*—Birch, Stewart, Kolasch & Birch, LLP

(57) ABSTRACT

A motor includes a stator, a first bearing, a second bearing, a first buffer element, a second buffer element and a rotor. The rotor has a shaft passing though the first bearing, the second bearing, the first buffer element and the second buffer element in order. The first buffer element is disposed adjacent to the first bearing for buffering in one direction, and the second buffer element is disposed adjacent to the second bearing for buffering in another direction.

20 Claims, 3 Drawing Sheets

MOTOR

BACKGROUND OF THE INVENTION

1. Field of Invention

The invention relates to a motor and, in particular, to a motor with a two-direction buffering function.

2. Related Art

With reference to FIG. 1, a conventional motor 1 generally includes a stator 11, a first bearing 121, a second bearing 122, a spring 123, and a rotor 13. The stator 11 has a hole 111. The first bearing 121, the second bearing 122 and the spring 123 are disposed in the hole 111. The first bearing 121 and the second bearing 122 are in touch with the inner wall of the hole 111 and positioned inside the hole 111. Besides, the spring 123 is connected to one side of the second bearing 122. The rotor 13 has a shaft 131, which is disposed in the hole 111, passing through the first bearing 121, the spring 123, and the second bearing 122 in order.

When the motor 1 starts, the electrical field of the coil winding around the stator 11 or the rotor 13 fluctuates to cause variation in the magnetic field. The rotor 13 is driven by the magnetic force to rotate relative to the stator 11. However, at the instant that the motor 1 starts or stops, the rotor 13 is under an abrupt magnetic force. This magnetic force does not only rotate the rotor 13, but often pushes the shaft 131 along the axis. Therefore, the shaft 131 generates an impact on the first bearing 121 or the second bearing 122, and may even cause vibrations between the first bearing 121 and the second bearing 122. This will eventually result in damages to the motor 1 and make it fail.

In the conventional structure, only the spring 123 touches against the second bearing 122 and alleviates the force on it. Thus, the first bearing 121 is still under the above-mentioned impact and may be damaged.

Besides, once the motor 1 is under an external force, such as a hit or a collision, the force will concentrate on the shaft 131. Therefore, the shaft 131 also generates an impact on the first bearing 121 and the second bearing 122. However, the spring 123 can only relieve the external force on the second bearing 122 while the first bearing 121 may still be damaged due to the external force.

SUMMARY OF THE INVENTION

In view of the foregoing, the invention provides a motor having a two-direction buffering function for absorbing shocks, which can prevent the drawback of the conventional motor without effective vibration buffers and can achieve a good buffering effect.

To achieve the above, a motor with a two-direction buffering function of the invention includes a stator, a first bearing, a second bearing, a first buffering element, a second buffering element, and a rotor. The stator has a hole. The first bearing and the second bearing are disposed in the hole. The first buffering element is disposed in the hole adjacent to the first bearing. The second buffering element is disposed in the hole adjacent to the second bearing. The rotor has a shaft, which goes through the first bearing, the second bearing, the first buffering element, and the second buffering element in order.

As mentioned above, by use of the first and second buffering elements, the motor with the two-direction buffering function of the invention can alleviate the impact on the first bearing and the second bearing due to the shaft motion. Accordingly the two-direction buffering function can be achieved. As a result, the above-mentioned structure can ensure the stability of the motor of the invention so as to elongate its lifetime.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
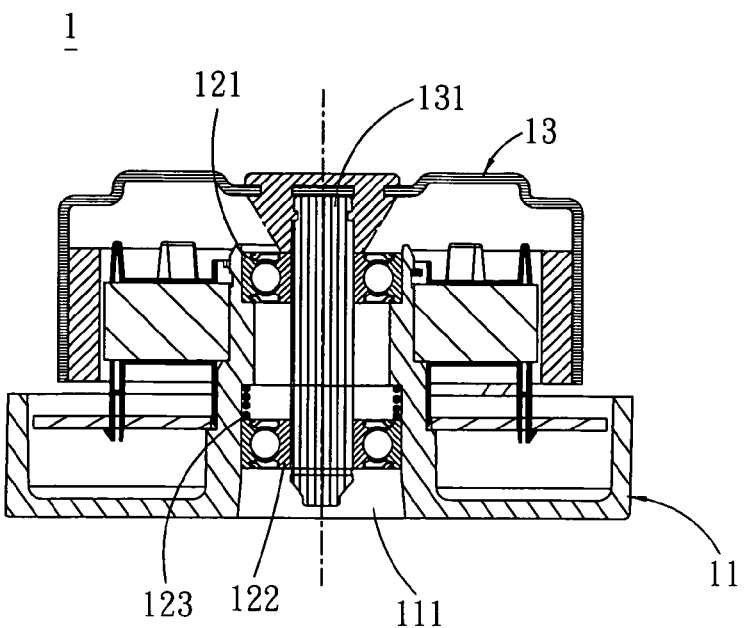
FIG. 1 is a schematic view of the conventional motor.
Figure 2:
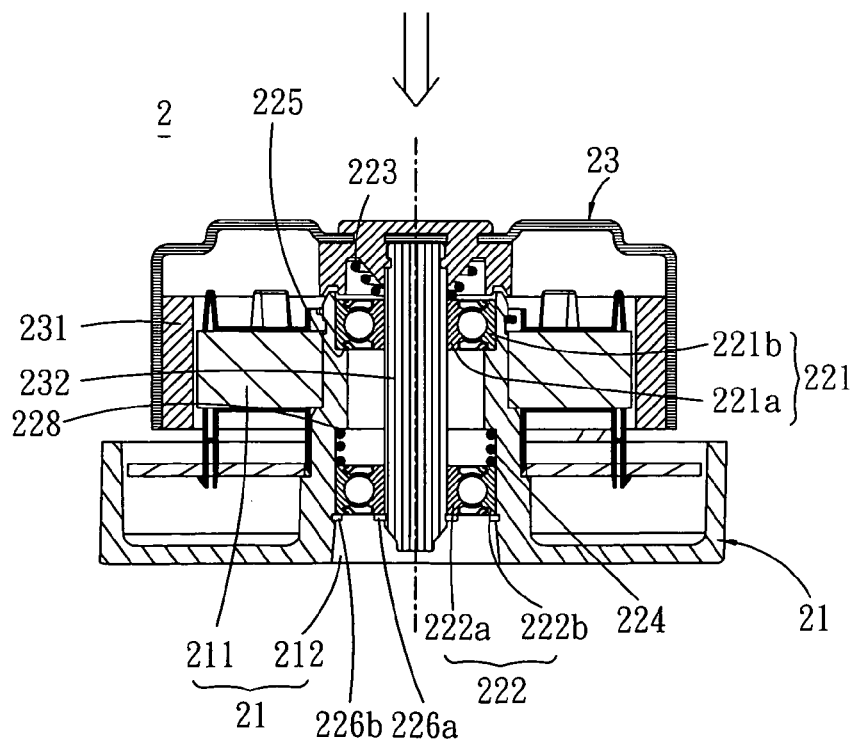
FIG. 2 is a schematic view of a motor according to a preferred embodiment of the invention.

As shown in FIG. 2, a motor 2 according to a preferred embodiment of the invention includes a stator 21, a first bearing 221, a second bearing 222, a first buffering element 223, a second buffering element 224, and a rotor 23.

The stator 21 has at least a coil 211 and a hole 212.

The first bearing 221 is disposed inside the hole 212. Moreover, the first bearing 221 is a ball bearing with an inner ring portion 221a and an outer ring portion 221b. The second bearing 222 is also disposed inside the hole 212. Moreover, the second bearing 222 is also a ball bearing with an inner ring portion 222a and an outer ring portion 222b.

In the present embodiment, the first buffering element 223 is a spring and is disposed inside the hole 212 and adjacent to the first bearing 221. The second buffering element 224 in this embodiment is also a spring, disposed inside the hole 212 and adjacent to the second bearing 222.

The hole 212 of the stator 21 further includes a first positioning portion 225 and a second positioning portion 228. In this embodiment, the first positioning portion 225 and the second positioning portion 228 are two shoulder portion of the hole 212 protruding from the inner wall of the hole 212.

In this embodiment, two positioning plates 226a and 226b are disposed under the second bearing 222 at the positions corresponding to the inner ring portion 222a and the outer ring portion 222b of the second bearing 222.

The rotor 23 has at least one magnet 231 and one shaft 232. The shaft 232 is disposed in the hole 212, and passes through the first buffering element 223, the first bearing 221, the second buffering element 224, and the second bearing 222. The magnet 231 and the coil 211 are disposed in according to each other. Since the magnet 231 generates a magnetic field with the coil 211 of the stator 21, the rotor 23 thus rotates relative to the stator 21.

In this embodiment, the top end of the first bearing 221 is disposed adjacent to the first buffering element 223. The bottom end of the first bearing 221 is disposed adjacent to the first positioning portion 225. One end of the first buffering element 223 touches against the inner ring portion 221a of the first bearing 221. The other end of the first buffering element 223 is disposed adjacent to the rotor 23. The top end of the second bearing 222 is coupled to the second buffering element 224. The bottom end of the second bearing 222 is disposed adjacent to the two positioning plates 226a and 226b. One end of the second buffering element 224 touches against the outer ring portion 222b of the second bearing 222. The other end of the second buffering element 224 is disposed adjacent to the second positioning portion 228. Therefore, if an external force (as indicated by the arrow in FIG. 2) is exerted along the shaft 232 downward on the rotor 23, the first buffering element 223 restrict the downward motion of the first bearing 221 due to the limitation of the first positioning portion 225. The rotor 23 pushes and compresses the first buffering element 223 for generating an elastic restoring force. This enables the rotor 23 to return to its original position. Therefore, the first buffering element 223 has a buffering function in that direction. Likewise, if another external force (not shown) is imposed upward along the shaft 232 on the shaft 232, the second buffering element 224 touches the second positioning portion 228 on one side and the second bearing 222 on the other side. Therefore, the external force pushes the second buffering element using the positioning plate 226a, thereby generating an elastic restoring force. This enables the shaft 232 to return to its original position. Therefore, the second buffering element 224 also has a buffering function in that direction. If the motor 2 is under an external force due to a hit or collision on both sides, it can avoid damages due to its two-direction buffering function in comparison with the prior art.

In this embodiment, the first buffering element 223 is disposed adjacent to the inner ring portion 221a of the first bearing 221, but the invention is not limited to this condition. Disposing the first buffering element 223 adjacent to the outer ring portion 221b of the first bearing can achieve the same effect. Herein, the second buffering element 224 is disposed adjacent to the outer ring portion 222b of the second bearing 222. Likewise, disposing the second buffering element 224 adjacent to the inner ring portion 222a of the second bearing 222 achieves the same effect too. Besides, as the first buffering element 223 is installed between the rotor 23 and the first bearing 221, a pressure is pre-imposed thereon so that the rotor 23 can be readily positioned. Similarly, the second buffering element 224 is also pre-imposed by a pressure, so that the shaft 232 can be readily positioned.

In the above-mentioned structure, the first buffering element 223 and the second buffering element 224 are both springs. Of course, they can be elastic chips, retractable sleeves, sponge sleeves, rubber sleeves, their combinations, or any other elements with buffering functions.

Figure 3:
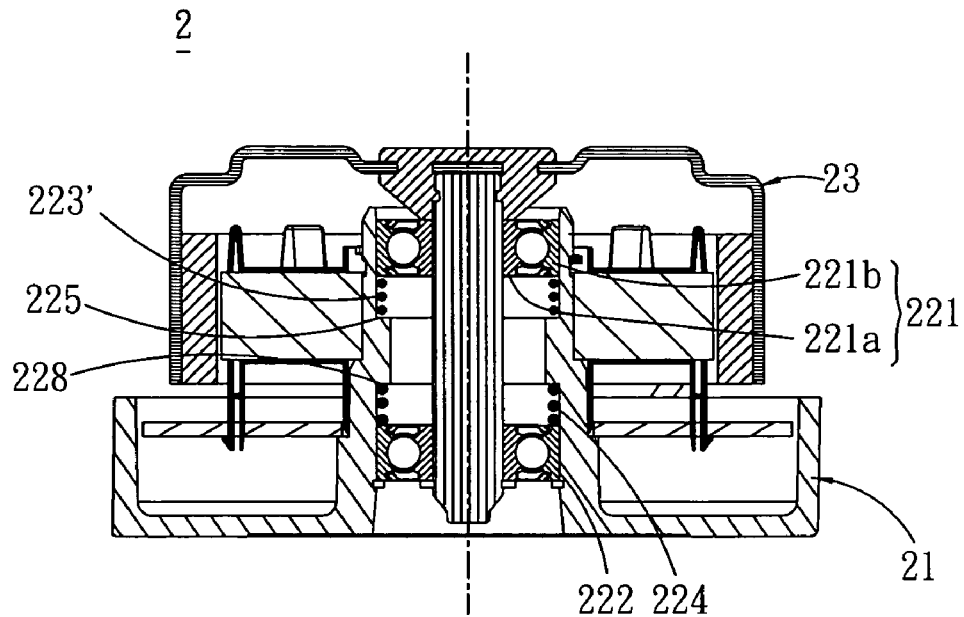
FIG. 3 is another schematic view of the motor according to the preferred embodiment of the invention.
Figure 4:
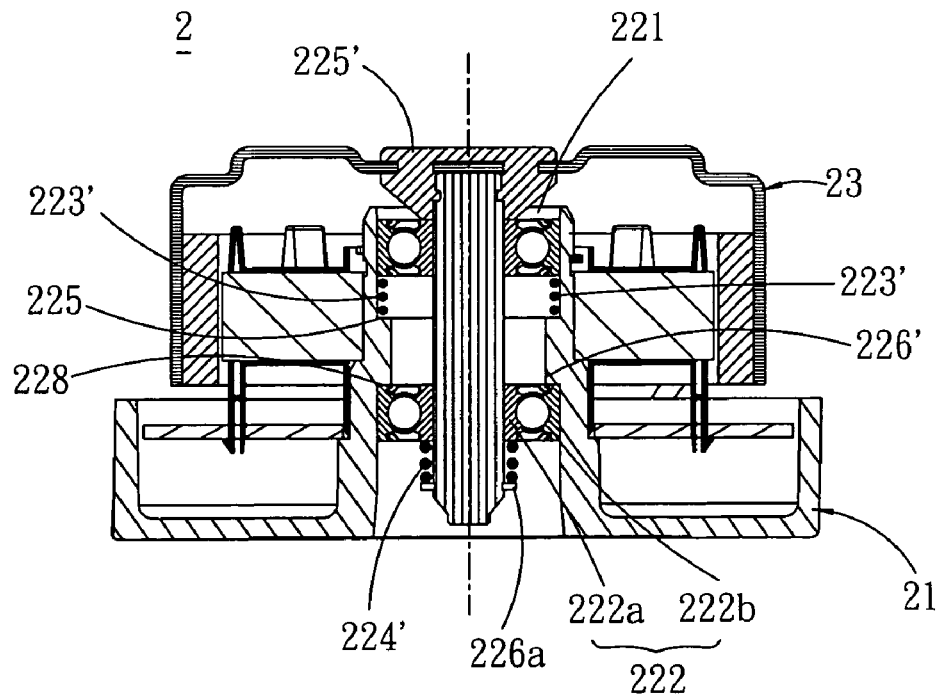
FIG. 4 is still another schematic view of the motor according to the preferred embodiment of the invention.

With reference to FIG. 3, the top end of the first bearing 221 touches against the rotor 23, and the bottom end thereof touches against one end of the first buffering element 223'. The other end of the first buffering element 223' touches against the first positioning portion 225. Other elements are the same as the previous embodiment. With reference to FIG. 4, the top end of the second bearing 222 touches against the second positioning portion 228, and the bottom end thereof touches against one end of the second buffering element 224'. The other end of the second buffering element 224' is disposed adjacent to the positioning plate 226a. Other elements are the same as the previous embodiment. From the detailed description of the above-mentioned embodiment, the varied installations of the first bearing 221 and the second bearing 222 in FIGS. 3 and 4 can achieve the same two-direction buffering function for the motor 2 of the invention.

To be noted, the first buffering element and the second buffering element in the invention are disposed adjacent respectively to one end of the first bearing and the second bearing. In the embodiment, the first and second buffering elements can be disposed adjacent respectively to the first and second bearings by the combination way of welding or adhesion. Alternatively, the first bearing and the first buffering element or the second bearing and the second buffering element are not bonded by any means but touch against each other. In another case, some other objects, such as annular plates, are inserted between the first bearing and the first buffering element or between the second bearing and the second buffering element, so that the first buffering element or the second buffering element are connected to the first bearing or the second bearing indirectly. Even in such a case, the first buffering element and the second buffering element can still buffer the force exerted on the motor.

Figure 5:
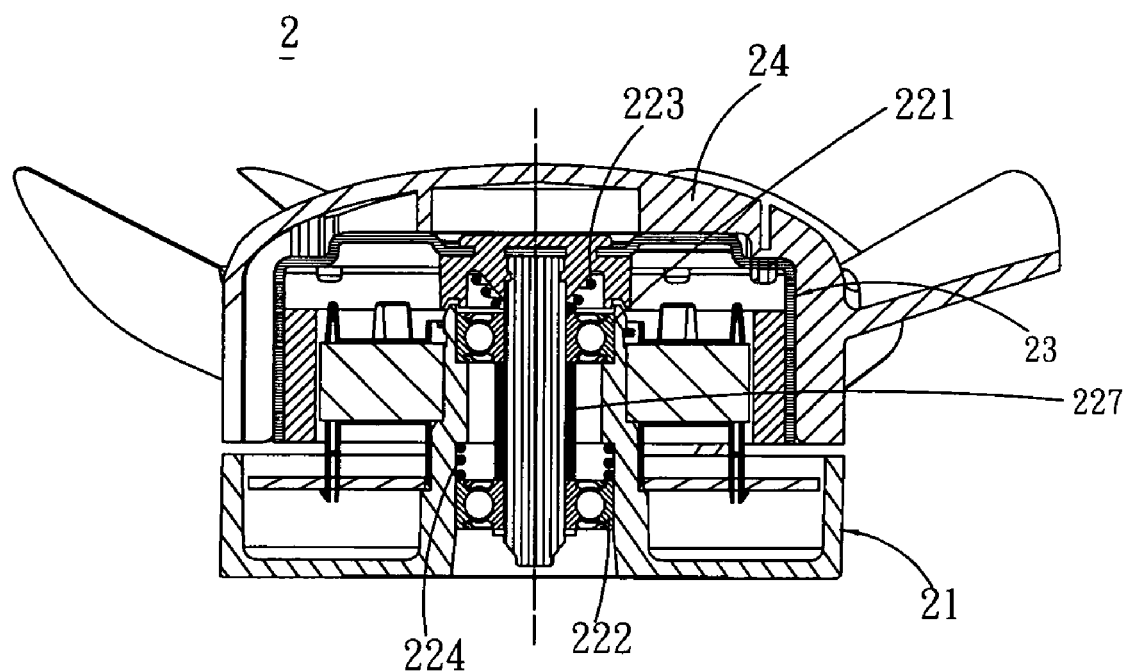
FIG. 5 is yet another schematic view of the motor according to the preferred embodiment of the invention.

Finally, please refer to FIG. 5. The motor 2 of the invention can be combined with an impeller 24, which is installed on the outer edge of the rotor 23. When the rotor 23 rotates relative to the stator 21, the impeller also rotates to produce a wind. Besides, the motor 2 of the invention further includes a sleeve 227, which can be either a rigid or elastic sleeve. The elastic sleeve can be a spring, an elastic chip, a retractable sleeve, a sponge sleeve, a rubber sleeve, their combinations or other elements with the buffering function. The sleeve 227 is mounted on the shaft 232 of the rotor 23 between the first bearing 221 and the second bearing 222. It is used to fix the relative positions of the first bearing 221 and the second bearing 222.

In summary, by use of the first and second buffering elements, the motor with the two-direction buffering function of the invention can alleviate the impact on the first bearing and the second bearing due to the shaft motion. Accordingly the two-direction buffering function can be achieved. As a result, the above-mentioned structure can ensure the stability of the motor of the invention so as to elongate its lifetime.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A motor, comprising:
a stator having a hole;
a first bearing disposed inside the hole;
a second bearing disposed inside the hole;
a first buffering element for avoiding a damage caused by an external force, disposed inside the hole and bearing against an inner portion of the first bearing;
a second buffering element disposed inside the hole and adjacent to an outer portion of the second bearing;
a rotor having a shaft passing through the first bearing, the second bearing, the first buffering element, and the second buffering element; and
a sleeve mounted on the shaft and located between the first bearing and the second bearing,
wherein one end of the first buffering element is disposed adjacent to one end of the first bearing, and the other end of the first buffering element is disposed adjacent to one end of the shaft, and
wherein the first buffering element and the second buffering element have a two directional buffering function.

2. The motor of claim 1, wherein the sleeve is a rigid sleeve or an elastic sleeve.

3. The motor of claim 2, wherein the elastic sleeve is a spring, an elastic chip, a retractable sleeve, a sponge sleeve, and a rubber sleeve.

4. The motor of claim 1, wherein the first buffering element or the second buffering element is a spring, an elastic chip, a retractable sleeve, a sponge sleeve, or a rubber sleeve.

5. The motor of claim 1, wherein the first or the second bearing is a ball bearing, and the sleeve bears against between the inner portion of the first bearing and an inner portion of the second bearing for fixing the relative positions of the first bearing and the second bearing.

6. The motor of claim 5, wherein the first bearing has an inner ring portion and an outer ring portion, and the first buffering element is disposed adjacent to one of the inner ring portion and the outer ring portion of the first bearing.

7. The motor of claim 5, wherein the second bearing has an inner ring portion and an outer ring portion, and the second buffering element is disposed adjacent to one of the inner ring portion and the outer ring portion of the second bearing.

8. The motor of claim 1, wherein the first buffering element and the second buffering element receive a pre-pressure, respectively.

9. The motor of claim 1, wherein one end of the first bearing is disposed adjacent to one end of the first buffering element, and the other end of the first buffering element is disposed adjacent to the rotor.

10. The motor of claim 1, wherein the stator further comprises a first shoulder portion formed on an inner wall of the hole.

11. The motor of claim 10, wherein the first buffering element is disposed adjacent between the first bearing and the first shoulder portion.

12. The motor of claim 11, wherein the stator further comprises a second shoulder portion formed on an inner wall of the hole.

13. The motor of claim 12, wherein the second buffering element is disposed between the second shoulder portion and the second bearing.

14. The motor of claim 1, further comprising a first positioning plate positioned on one end of the shaft.

15. The motor of claim 14, wherein the second buffering element is disposed between the first positioning plate and the second bearing.

16. The motor of claim 1, wherein the stator further comprises a coil and the rotor further comprises a magnet and an impeller, and the coil and the magnet are positioned opposite to each other.

17. The motor of claim 14, further comprising a second positioning plate mounted on an inner wall of the hole and adjacent to the second bearing.

18. A motor, comprising:
a stator having a hole;
a first bearing disposed inside the hole;
a second bearing disposed inside the hole;
a first buffering element for avoiding a damage caused by an external force, disposed inside the hole and bearing against an inner portion of the first bearing;
a second buffering element disposed inside the hole and adjacent to the second bearing;
a rotor having a shaft passing through the first bearing, the second bearing, the first buffering element, and the second buffering; and
a sleeve mounted on the shaft and located between the first bearing and the second bearing and wherein the sleeve bears against between the inner portion of the first bearing and an inner portion of the second bearing for fixing the relative positions of the first bearing and the second bearing.

19. A motor comprising:
a stator having a hole, a first positioning portion, second positioning portion and a positioning plate, wherein the first positioning portion and the second positioning portion are two shoulder portion protruding from the inner wall of the hole;
a first bearing disposed inside the hole;
a second bearing disposed inside the hole;
a first buffering element disposed inside the hole and adjacent to the first bearing;
a second buffering element disposed inside the hole and adjacent to the second bearing, wherein the second buffering element and the second bearing are disposed between second positioning portion and the positioning plate;
a rotor having a shaft passing through the first buffering element, the first bearing, the second buffering element and the second bearing in order, wherein the first buffering element and the first bearing are disposed between one end of the shaft and the first positioning portion; and
a sleeve mounted on the shaft and located between the first bearing and the second bearing,
wherein when an external force is exerted along the shaft downward on the rotor, the first buffering element restrict the downward motion of the first bearing due to the limitation of the first positioning portion, and then the rotor pushes and compresses the first buffering element for generating an elastic restoring force so that the first buffering element has a buffering function, and
wherein when another external force is imposed upward along the shaft on the shaft, the external force pushes the second buffering element by the positioning plate, and then that second buffering element generates an elastic restoring force so that the second buffering element has a buffering function.

20. The motor of claim 1, wherein in the external force is a hit or collision.

* * * * *